United States Patent [19]
Nola

[11] 4,388,585
[45] Jun. 14, 1983

[54] ELECTRICAL POWER GENERATING SYSTEM
[75] Inventor: Frank J. Nola, Huntsville, Ala.
[73] Assignee: The United States of America as represented by the Administrator of the National Aeronautics and Space Administration, Washington, D.C.
[21] Appl. No.: 243,683
[22] Filed: Mar. 16, 1981
[51] Int. Cl.³ .............................................. H02P 9/00
[52] U.S. Cl. ...................................... 322/47; 322/29; 322/35; 322/95
[58] Field of Search ....................... 322/29, 32, 47, 89, 322/90, 95, 2 R, 35; 290/44, 55

[56] References Cited
U.S. PATENT DOCUMENTS 3,946,242  3/1976  Wilkerson ............................ 322/2 R
3,982,170  9/1976  Gritter et al. ...................... 322/32 X
4,242,628  12/1980  Mohan et al. ..................... 322/47 X OTHER PUBLICATIONS
"Energy Saving in AC Generators", Nola; NASA Tech. Briefs; vol. 5, No. 2; pp. 134, 135; Summer, 1980.

Primary Examiner—R. J. Hickey
Attorney, Agent, or Firm—L. D. Wofford, Jr.; J. R. Manning; J. H. Beumer

[57] ABSTRACT

A power generating system for adjustably coupling an induction motor, as a generator, to an A.C. power line wherein the motor and power line are connected through a triac. The triac is regulated to normally turn "on" at a relatively late point in each half cycle of its operation, whereby at less than operating speed, and thus when the induction motor functions as a motor rather than as a generator, power consumption from the line is substantially reduced.

1 Claim, 2 Drawing Figures

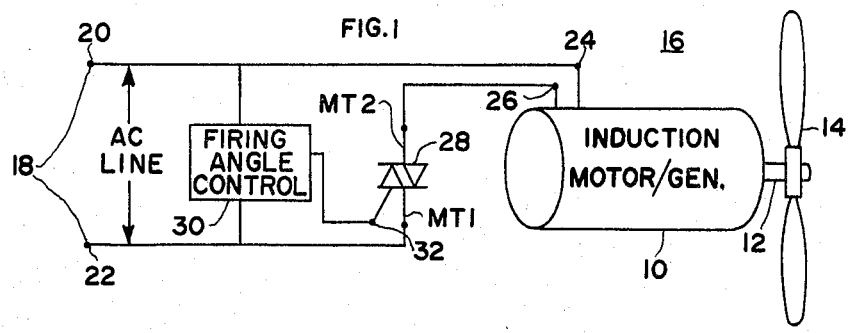
FIG. 1
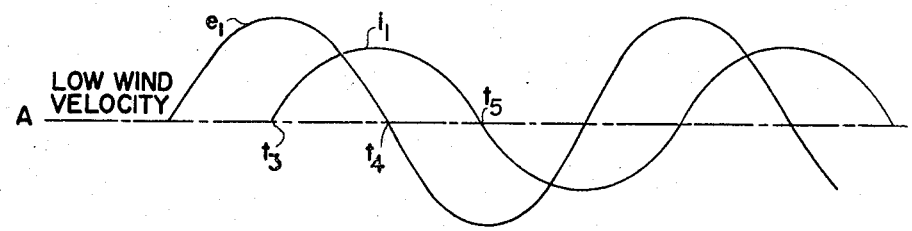
FIG. 2
A LOW WIND VELOCITY
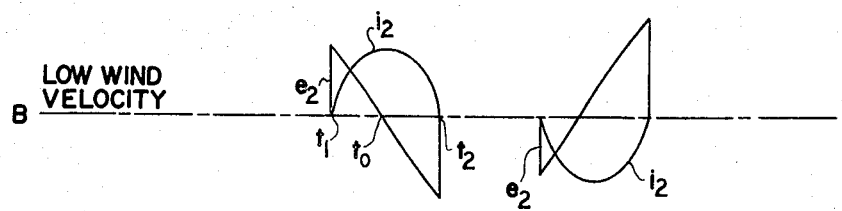
B LOW WIND VELOCITY
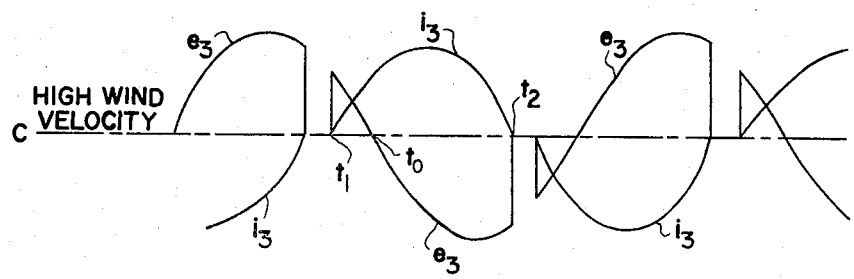
C HIGH WIND VELOCITY

//4,388,585

ELECTRICAL POWER GENERATING SYSTEM

ORIGIN OF THE INVENTION

The invention descriged herein was made by an employee of the U.S. Government and may be manufactured and used by or for the Government of the United States for governmental purposes without the payment of any royalties thereon or therefor.

TECHNICAL FIELD

This invention relates to electrical power generation, and particularly to an auxiliary generating system for coupling an induction motor type generator to an A.C. power line for adding power to that line.

BACKGROUND ART

In the past few years, there has been a considerable effort to develop new sources of electrical power. Included has been the development of systems primarily designed for providing power to a single enterprise, for example, a household, with any excess generated power being fed back to a power line of a public utility providing a primary source of power for that household. Frequently, the auxiliary or local power generating unit is in the form of a windmill, and there are times when little or insufficient power is available from it alone. Thus, as a matter of convenience, in order to preserve a continuous interconnection of power to on-site electrical devices to be powered, the windmill and public utility power lines are connected together.

Windmill generators have typically been of the direct current type, and thus in order to achieve compatibility with public power lines, which are of alternating current powder, the output of such a generator must be converted to alternating current power. This is accomplished by switching means operating synchronously with the frequency, typically 60 cycles, of the power line. In addition to effecting frequency compatibility, there must be both voltage amplitude and phase compatibility between the generated output and the power line voltage. All in all, such a coupling system is necessarily complex and costly.

As an alternate to the direct current generator, induction motor/generator units are sometimes used with windmill generating systems. While the induction motor/generator has not seen great use as a generator in the past, it is perhaps the most widely used type of motor, and thus is widely available and at a reasonable cost.

The power input to an induction motor is given by the product of the applied voltage, the current, and the cosine of the phase angle between the voltage and current (E I Cosine a). In a heavily loaded motor, the current will tend to be in phase with the voltage. When unloaded, the current will typically lag the voltage 70° to 80°. If an external force tends to drive the shaft higher than synchronous speed, the phase lag will continue to increase. When the force is sufficient to cause the phase lag to be 90°, the power input to the motor is zero since cosine 90°=0. At this point, the mechanical energy applied to the shaft is exactly equal to the magnetizing losses, and there is no net energy being returned to the A.C. buss. As the driving force continues to increase, the phase angle becomes greater than 90°. The cosine of angles greater than 90° is negative, indicating negative power flow. The motor is now generating and returning energy to the A.C. buss. Further increase in driving force causes the phase lag to approach 180° as the full generatiing capacity of the machine is reached.

Significantly, the induction generator requires no synchronization or voltage regulation circuitry to couple its output to a power line. It inherently functions as a generator when it is driven above its synchronization speed, a speed equal to the frequency of the power line divided by the number of pairs of poles that it contains, typically the speed being 1,800 rpm in the case of a 4-pole device. It, like a direct current generator, is typically connected to a power line when its speed is sufficient for the production of power which, in the case of the induction motor/generator, is at sync speed. Beyond this speed, and in the range of approximately five percent of the sync speed, this type device provides increasing power output to a power line, this increase occurring as the phase lag of current with respect to voltage increases above 90°, an angle which persists at the sync speed.

Despite the obvious advantages of the induction motor/generator over a D.C. generator as described, the former has one significant disadvantage. It must draw field excitation power from the power line that is connected to it. This excitation current is drawn during a portion of each half cycle of the A.C. line voltage when current and voltage are of the same polarity, which, in the case of a lightly driven generator, is only slightly less than one-half of each half cycle. Thus, in such case, it can only function as a generator during the remaining slightly more than one-half of each half cycle, and thus its net output as a generator is essentially slight. At higher speeds, the ratio of power drawn to power delivered improves.

It is the object of this invention to effectively reduce the portion of each half cycle where current is drawn by the generator, and thus substantially improve its efficiency, particularly at low velocity drive levels which, in the case of windmill operation, may persist for a substantial portion of the time of operation.

Disclosure of the Invention

In accordance with this invention, an induction motor/generator is mechanically driven and electrically coupled to an A.C. power line through a thyristor or thyristors operated to retard the time of interconnection to a relatively late point in each half cycle of the A.C. line voltage, whereby the energizing power supplied by the line to the motor/generator may be decreased, and thereby the net power delivered to the line may be increased. Typically, a triac would be employed as the thyristor. Alternately, two SCR devices connected in antiparallel may be employed instead.

Brief Description of the Drawings

FIG. 1 is a schematic illustration of an embodiment of the invention.

FIG. 2 is a graphical presentation of characteristics of operation of the invention.

Best Mode For Carrying Out the Invention

Referring to the drawings, an A.C. induction motor/generator 10 is mechanically driven through shaft 12 by a propeller 14 of a windmill 16. In this illustration, a 115-volt (or other voltage) A.C. power line 18 is coupled to terminals 20 and 22 and thence to the circuit of this invention. Thus, terminal 20 is connected to one terminal 24 of generator 10, and a second power terminal 22 is connected through triac 28 to terminal 26 of generator 10, connection being via conventional triac power terminals MF1 and MT2. The firing angle for triac 28 is set by a conventional firing angle control 30, which is connected to power line 18 and supplied a trigger voltage to the gate terminal 32 of triac 28.

As a feature of this invention, triac 28 is controlled to be turned "on" at a selected point, a relatively late point, in each half cycle of the A.C. voltage cycle as supplied by line 18. Typically, this voltage is at approximately 150° into each half cycle. From this point, and until the 180° point when the line voltage passes through zero, the power line actually supplies an energizing field current to generator 10 to enable immediately following operation as a generator during a portion of the next half cycle. The turn "on" point is set no later than needed to effect generator operation for the particular generator used. Thus, power drain by the generator is minimized.

Most significant in the present invention is the applicant's utilization of the characteristic of the triac to turn "off" only after current goes through zero following a turn "on" of the triac as described. Significantly, this zero crossing by the current occurs when the generator ceases to deliver power to the line after which point the generator would consume power. Thus, there is achieved an automatic optimum control of the period of coupling between the line and generator.

The operation described will be better appreciated by reference to the waveforms shown in FIG. 2 illustrative of the employment of induction motor/generator 10 with and without the present invention. Waveforms A, which will be first examined, are illustrated of windmill operation for a relatively low wind velocity and for the conventional case where triac 28 is omitted and generator 10 and power line 18 are directly connected. Curve $e_1$ is representative of line voltage of A.C. power line 18. Curve $i_1$ is illustrative of current flow between an A.C. power line and an induction motor/generator.

Waveform B of FIG. 2 illustrates, comparatively, the electrical operation of the system constructed in accordance with the present invention as illustrated by the circuit of FIG. 1, and wherein operation is for a like (low) wind condition to that depicted by waveforms A. In the applicant's system, triac 28 is keyed "on" at approximately the 150° point $t_1$ in each half wave voltage cycle of power line 18 as described above. Voltage curve $e_2$ is illustrative of the voltage present on generator 10. Current curve $i_2$ is illustrative of current flow concurrent with voltage, both terminating at point $t_2$ during each half cycle.

Significantly, it is to be noted with respect to waveforms A and B that when current and voltage are of a like polarity, power is being extracted from the line by a generator to energize its field; and when current and voltage are of an unlike polarity, the generator functions to furnish power back to the line.

To examine first the operation of the conventional case, and with reference to waveforms A, it is to be noted that power is supplied by a power line to an induction motor/generator from time point $t_3$ to time point $t_4$, and power supplied by the generator to the power line from time point $t_4$ to time point $t_5$. By examination of the curves during the two intervals; it is to be appreciated that there would occur only a slightly greater magnitude of power flow (current times voltage) from the generator to the line than from the line to the generator. Thus, there is little net power supplied to the line.

In contrast, by the employment of the applicant's system, with the same wind velocity, the power supplied the line by the generator exceeds the power consumed by a greater margin. This is illustrated in waveform B by comparing the combination of voltage and current curves $e_2$ and $i_2$, respectively, for the power consumption interval from time point $t_1$ to time point $t_0$ and the power generation interval from time point $t_0$ to time point $t_2$.

Waveform C illustrates by voltage curve $e_3$ and current waveform $i_3$ operation of the system shown in FIG. 1 for a relatively high wind velocity condition. Here, as will be noted, the energization period for the windmill is the same as shown in waveforms B, from time point $t_1$ to time point $t_0$, but the power generation portion from $t_0$ to the end of the current half cycle $t_2$ is significantly expanded.

The applicant has not attempted to detail requirements for driving an induction motor/generator at a range just above its synchronization speed, as such arrangements may vary substantially. It is to be understood, however, that depending upon the optimum operating speed of the drive element, e.g., propeller 14, there would be appropriate gearing between the drive element and the shaft of the induction motor/generator.

The present invention has its principal effect in improving efficiency when the generator is driven, in the lower portion of its speed range, as in the case of windmill operation depicted in waveforms B. It enables a lower threshold of windmill speed for power generation, and in its lower velocity range of operation, it enables a greater electrical output. Considering now that in many installations environmental winds are less than maximum most of the time, it is to be appreciated that the present invention provides a valuable contribution to the art.

I claim:

1. An electrical generating system comprising:
   an induction motor/generator device having a power shaft and a pair of power terminals;
   rotary power means for coupling a rotating movement to said power shaft;
   an alternating current power supply line having a pair of power terminals;
   triac means, including at least one triac, having a control input and a pair of power terminals;
   said power terminals of said device and power line being interconnected through said power terminals of said triac, and
   control means connected between one of said power terminals and said control input of said triac for delaying the turn "on" point of said triac with respect to the period of each half cycle of alternating current power to normally limit the power transfer from said power line to said device;
   whereby a higher net transfer of power from said device to said power line may be obtained.

* * * * *